(12) United States Patent
Hong

(10) Patent No.: US 11,101,665 B2
(45) Date of Patent: Aug. 24, 2021

(54) SAFE MULTI-DIRECTIONAL CHARGER

(71) Applicant: Tian-Yong Hong, Taizhou (CN)

(72) Inventor: Tian-Yong Hong, Taizhou (CN)

(*) Notice: Subject to any disclaimer, the term of this patent is extended or adjusted under 35 U.S.C. 154(b) by 259 days.

(21) Appl. No.: 16/357,359

(22) Filed: Mar. 19, 2019

(65) Prior Publication Data

US 2020/0303936 A1    Sep. 24, 2020

(51) Int. Cl.
| | | |
|---|---|---|
| *H01M 10/44* | (2006.01) | |
| *H01M 10/46* | (2006.01) | |
| *H02J 7/00* | (2006.01) | |
| *H02J 7/02* | (2016.01) | |
| *H02J 50/10* | (2016.01) | |
| *H02J 7/35* | (2006.01) | |
| *H02J 50/30* | (2016.01) | |

(52) U.S. Cl.
CPC ............ *H02J 7/00* (2013.01); *H01M 10/465* (2013.01); *H02J 7/008* (2013.01); *H02J 7/0027* (2013.01); *H02J 7/025* (2013.01); *H02J 7/35* (2013.01); *H02J 50/10* (2016.02); *H02J 50/30* (2016.02)

(58) Field of Classification Search
CPC .. H02J 7/35; H02J 7/025; H02J 7/0042; H02J 7/0047; H02J 50/10; H02J 50/30; H01M 10/60; H01M 10/42; H01M 10/465

USPC ....... 320/101, 107, 108, 114, 115, 132, 149; 307/104; 136/244, 291, 293
See application file for complete search history.

(56) References Cited

U.S. PATENT DOCUMENTS

| | | | | |
|---|---|---|---|---|
| 2014/0302352 | A1* | 10/2014 | Lenz ................. | H01M 10/4257 429/7 |
| 2015/0022001 | A1* | 1/2015 | Goei ......................... | H02J 9/06 307/65 |
| 2016/0149426 | A1* | 5/2016 | Hodges ................... | H02J 50/80 320/108 |
| 2016/0285495 | A1* | 9/2016 | Vick ..................... | H04B 1/3888 |
| 2017/0167669 | A1* | 6/2017 | Purkiss ................... | H02J 50/10 |
| 2018/0131847 | A1* | 5/2018 | Kokonaski ........ | H04N 5/23293 |
| 2018/0288898 | A1* | 10/2018 | Jeong ............... | H02J 7/007192 |
| 2021/0036529 | A1* | 2/2021 | Rees ..................... | H04B 7/145 |

* cited by examiner

Primary Examiner — Edward Tso
(74) *Attorney, Agent, or Firm* — W&K IP

(57) ABSTRACT

The invention provides a safe multi-directional charger, including a charging portion and a battery portion, wherein the charging portion is provided with a current display and a charging slot, and the battery portion is provided with a battery. The battery is connected with a USB interface and a switch. The bottom of battery portion is provided with a solar panel for power generation, and the shell is equipped with a connecting ring and a hook. The invention can solve the problems of abnormal equipment working and current during charging through current display device and the charging failure without direct connection of power supply through solar panel.

10 Claims, 1 Drawing Sheet

SAFE MULTI-DIRECTIONAL CHARGER

TECHNICAL FIELD

The invention relates to the mobile charging field, in particular to a safe multi-directional charger.

BACKGROUND ART

Both charger and charging wire may become faulty or be aging over time which leads to abnormal charging of electronic device, the magnitude of output current of charger may become unsafe, and the current output to the electronic device to be charged does not meet the current magnitude requirements of electronic device. The existing wireless charger includes a charging head directly connected with AC power and a coil for generating induced current. The electronic device is provided with an induced coil corresponding to the coil. The charger may become faulty or be aging after it is used, so the electronic device cannot be charged normally. Normal charging means that the current of charging head flowing to electronic device is within the standard range. However, during use the electronic device may show it is being charged but actually it is not normally charged as the current flowing from the charger to the electronic device is too weak, but the user cannot judge the safety potential hazard such as charging equipment damage due to abnormal current flowing from the charging head to the electronic device. The existing charger cannot be charged when the power is exhausted or the power supply is not directly connected. Single charger can only charge for single equipment but cannot meet the requirement for simultaneous charging of more than one charger.

CONTENTS OF THE INVENTION

The invention can solve the existing technical problems and aims to judge whether the charging current is in safe charging range by checking the magnitude of current of electronic device displayed on the current display.

The technical proposal of the invention is:

A safe multi-directional charger includes a shell. A charging portion is arranged on the upper layer of the shell, a battery portion is arranged on the lower layer of the shell, a primary coil for wireless charging of magnetic field is arranged in the charging portion, and a battery is arranged in the battery portion; a current display is arranged on the upper portion of the charging portion and electrically connected with the primary coil. The shell is provided with an input end directly connected with the electric supply, the input end is electrically connected with the primary coil and the battery to supply power to the primary coil and the battery.

Further, the battery is electrically connected with the primary coil and supplies power.

Further, at least one USB interface is arranged outside the battery portion as the output end and outputs power from the battery. A switch is arranged on the same side of the USB interface, electrically connected with USB interfaces and outputs power of the battery to the USB interface; the output end of the battery to the USB interface is electrically connected with current display.

Further, a solar panel is arranged at the bottom of the battery portion, electrically connected with the battery, and charges the battery.

Further, the battery is connected with cooling fins.

Further, a charging slot is arranged on the upper charging portion of the charging portion for the placement of wireless charging equipment; clamping units are arranged in the four corners of the upper edge of the charging slot.

Further, four connecting rings are arranged in the four corners at the lower portion of the shell, and the four lower planes of the connecting rings protrude downward compared with the solar panel; hook is arranged outside the shell.

Further, the output end is the USB port.

Preferably, the current display is a digital ampere meter.

A method that monitors whether charging is normal with the above charger. The steps are as follows:

1): arrange a current display at the output end of the charger;

2): use the current from the charger when charging on the current display;

3): compare the magnitude of output current with the safe current range, and confirm whether the charger works normally.

The following beneficial effects are achieved by applying the invention:

The invention is able to display the current in real time when the electronic device is being charged by setting the current display. The amperemeter instantiates the current in the charging course of the electronic device, so that the user can more intuitively understand the current in the charging course of the electronic device and can judge whether the charging status of the electronic device is normal according to the data shown in the amperemeter. Providing the power to the battery through the solar panel solves the issues such as no power for the charger itself and failure of charging when there is no power directly connected. More than one piece of equipment can be charged at the same time via USB interface on the battery and wireless charging.

DESCRIPTION OF ATTACHED FIGURE

Figure 1:
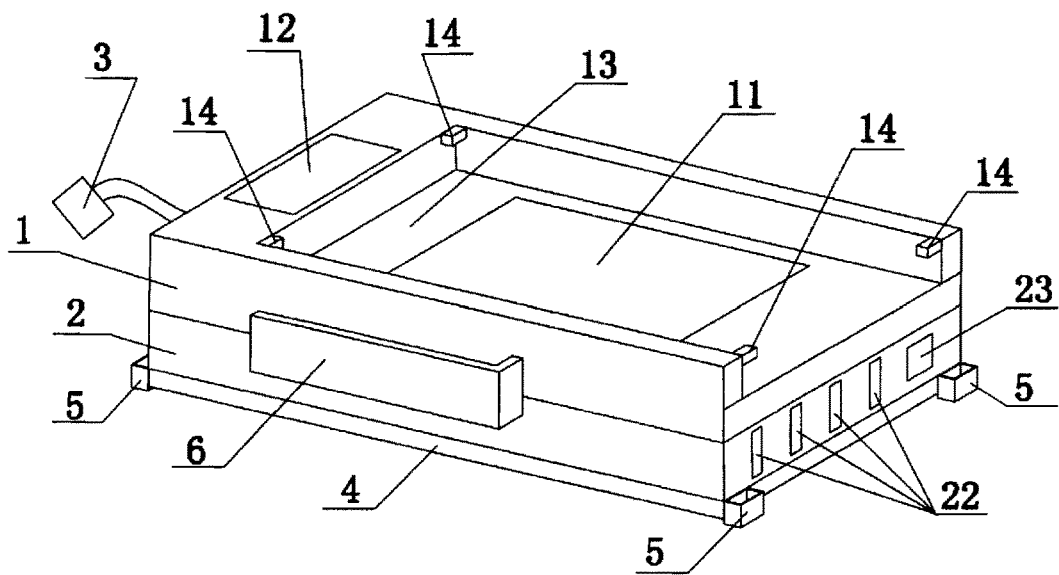
FIG. 1 is the stereostructure diagram of the invention.
Figure 2:
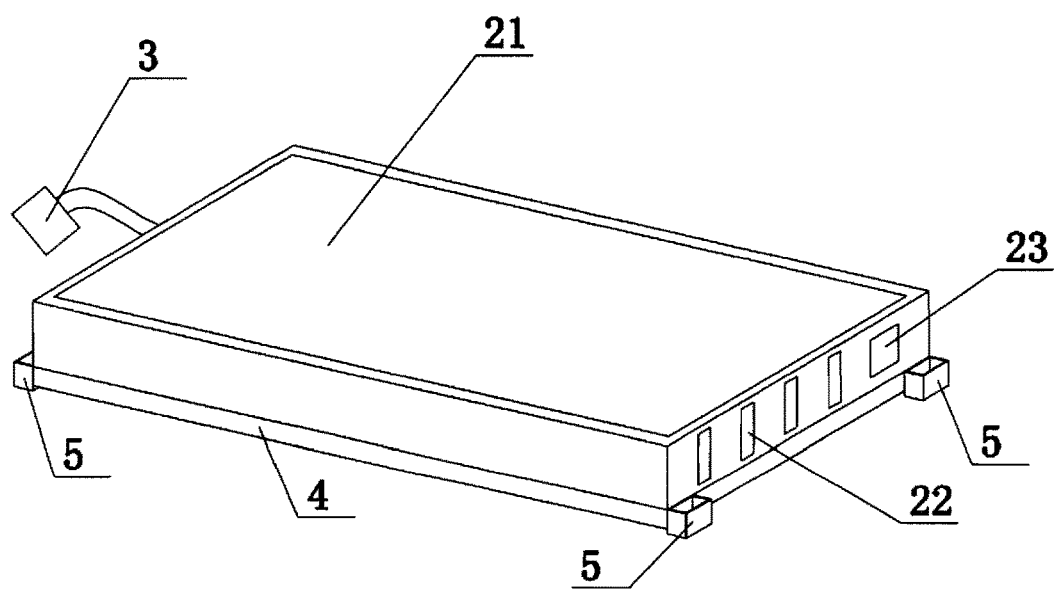
FIG. 2 is the structure diagram of battery portion of the invention.

In the Figure, 1 is charging portion, 11 is primary coil, 12 is current display, 13 is the charging slot, 14 is the clamping unit, 2 is the battery portion, 21 is the battery, 22 is USB interface, 23 is the switch, 3 is the input end, 4 is the solar panel, 5 is the connecting ring and 6 is the hook.

SPECIFIC IMPLEMENTATION METHOD

The attached figures are used below to make a further detailed description that is an explanation rather than a limitation to the invention.

EXAMPLE 1

A safe multi-directional charger includes a shell. A charging portion 1 is arranged on the upper layer of the shell, a battery portion 2 is arranged on the lower layer of the shell, a primary coil 11 for wireless charging of magnetic field is arranged in the charging portion 1, and a battery 21 is arranged in the battery portion 2; a current display 12 is arranged on the upper portion of the charging portion 1 and electrically connected with the primary coil 11. The shell is provided with an input end 3 directly connected with the electric supply, the input end 3 is electrically connected with the primary coil 11 and the battery 21 to supply power to the primary coil 11 and the battery 21.

A charging slot 13 is arranged on the upper portion of the charging portion 1 for the placement of wireless charging equipment; clamping units 14 are arranged in the four corners of the upper edge of the charging slot 13.

The electric supply is connected via the input end 3 to supply power to the primary coil 11 and to charge the battery 21 that is also electrically connected to the primary coil 11 and supplies power. When the input end 3 is not connected to the power supply, the power in the battery 21 is supplied to the primary coil 11. When the electronic device is wirelessly charged via the primary coil 11, the current display 12 shows the current flowing into the electronic device.

Clamping units 14 are placed in the electronic device in the charging slot 13 for limitation so that it will not fall along the vertical direction of the charger plane but will slide into and out of the electronic device along the horizontal direction of the charger plane.

At least one USB interface 22 is arranged outside the battery portion 2 as the output end and outputs power from the battery 21, a switch 23 is arranged on the same side of the USB interface 22, electrically connected with USB interface 22 and outputs power of the battery 21 to the USB interface 22; the output end of the battery 21 to the USB interface 22 is electrically connected with the current display 12.

The connection and disconnection of the battery 21 and the USB interface 22 are controlled by the switch 23, and the USB interface 22 can directly charge the electronic device via the USB connection line. An indicator lamp is furnished on the circuit controlled by the switch 23 to observe whether the USB interface can be charged. When several USB interfaces 22 are used, more than one piece of equipment can be powered simultaneously by battery 21.

The solar panel 4 is arranged at the bottom of the battery portion 2, electrically connected with the battery 21, and charges the battery 21.

A cooling fin is also connected to the battery 21, which generates heat when the battery 21 works, and the cooling fin plays a major role of heat dissipation to protect the equipment safety, especially when more than one piece of equipment is simultaneously charged on the charger using the battery 21. The more heat it generates, the more significant heat dissipation effects it produces.

Four connecting rings 5 are arranged in the four corners at the lower portion of the shell, and the four lower planes of the connecting rings 5 protrude downward compared with the solar panel 4; hook 6 is arranged outside the shell.

When the battery 21 is out of power or has no power input, the solar panel 4 can generate power and supply it to the charger, and a rope or a belt on the connecting ring 5 can be used to fix the charger or connect it to a place where it is needed to enable the function of facilitating placement of the charger, and the hanger 6 can be hooked on the item at will, and can also enable the function of facilitating placement of the charger.

The lower plane of the connecting ring 5 protrudes downward compared to the bottom surface of the solar panel 4, and when the charger is placed, there should be a gap between the solar panel 4 and the place where it is placed, to prevent wear and tear caused by movement or collision from occurring on the solar panel 4.

Setting the input end 3 as a USB port makes it easy to charge the charger in various ways under different circumstances.

The current display 12 can be a digital display ammeter or a pointer type ammeter, to personalize the charger and meet different people's preferences.

A method that monitors whether charging is normal with the above charger. The steps are as follows:

1): arranged a current display 12 at the output end of the charger;

2): use the current from the charger when charging on the current display 12;

3): compare the magnitude of output current with the safe current range, and confirm whether the charger works normally.

Monitor whether the charging is normal by following the above steps, to prevent accidents caused by equipment failure.

The embodiments given above are the excellent examples for realizing the invention that is not limited to the above embodiments. The nonessential additions and replacements made by the technicians in this field according to the technical characteristics of the technical proposal of the invention are within the scope of protecting the invention.

The invention claimed is:

1. A safe multi-directional charger comprising a shell, wherein a charging portion is arranged on an upper layer of the shell, a battery portion is arranged on a lower layer of the shell, a primary coil configured for producing a magnetic field for wireless charging is arranged in the charging portion, and a battery is arranged in the battery portion; wherein a current display is arranged on the upper portion of the charging portion and electrically connected with the primary coil, wherein the shell comprises an input end configured to be directly connected to a mains electric power supply, the input end is electrically connected with the primary coil and the battery to supply power to the primary coil and the battery;

wherein the current display is configured to display a magnitude of a current flowing into an electronic device that is being charged by the safe multi-directional charger.

2. The safe multi-directional charger as described in claim 1, wherein the current display is a pointer type ammeter.

3. The safe multi-directional charger as described in claim 1, wherein the battery is electrically connected with the primary coil for powering the primary coil.

4. The safe multi-directional charger as described in claim 1, wherein at least one USB interface is arranged outside the battery portion as an output end and is configured to output power from the battery, a switch is arranged on the same side of the USB interface, electrically connected with the USB interface and outputs power of the battery to the USB interface; the output end of the battery to the USB interface is electrically connected with the current display.

5. The safe multi-directional charger as described in claim 4, wherein a solar panel is arranged at a bottom of the battery portion, electrically connected with the battery, and charges the battery.

6. The safe multi-directional charger as described in claim 1, wherein a charging slot is defined in an upper portion of the charging portion for placement of wireless charging equipment; clamping units are arranged in four corners of an upper edge of the charging slot.

7. The safe multi-directional charger as described in claim 1, wherein four connecting rings are arranged in the four corners at a lower portion of the shell, and four lower planes of the connecting rings protrude downward compared with the solar panel; a hook is arranged outside the shell.

8. The safe multi-directional charger as described in claim 1, wherein the output end is a USB port.

9. The safe multi-directional charger as described in claim 1, wherein the current display is a digital display ammeter.

10. A method of monitoring a normal charging operation of the safe multi-directional charger as described in claim 1, the method comprising:
- arranging the current display at an output end of the safe multi-directional charger;
- using the magnitude of the current output from the safe multi-directional charger during charging that is obtained from the current display;
- comparing the magnitude of output current against a safe current range, and determining whether the safe multi-directional charger is working normally.

* * * * *